Patented Sept. 3, 1935

2,013,589

UNITED STATES PATENT OFFICE 2,013,589

MANUFACTURE OF SYNTHETIC RESINOUS PRODUCTS

Theodor Sutter, Basel, and Werner Wieland, Riehen, near Basel, Switzerland, assignors to firm Society of Chemical Industry in Basle, Basel, Switzerland No Drawing. Application January 23, 1933, Serial No. 653,215. In Switzerland February 3, 1932

4 Claims. (Cl. 260—130)

The present invention relates to a process for the manufacture of synthetic resinous products from fusible condensation products obtained by reacting primary aromatic amines and aldehydes.

It is known that by condensing aromatic amines with more than an equimolecular proportion of formaldehyde in presence of considerable proportions of acid, there are produced insoluble, infusible resins, which are characterized by their good dielectric and mechanical properties (compare British Patent 284,589). It is also known that such resins may be made in two stages. If in the first stage only equimolecular proportions of aldehyde and amine are caused to react in presence of a considerable proportion of acid there is obtained a fusible resin, soluble in solvents of high boiling point. These resins are then converted by means of an aldehyde or an agent yielding aldehyde or aldehyde condensation products into infusible condensation products (compare British Patent 342,325). A like two-stage process consists in first converting a Schiff's base, for instance anhydroformaldehyde-aniline, into a fusible resin by treatment with a considerable proportion of acid, and then converting this resin into an infusible, insoluble resin by condensation with a further proportion of aldehyde or agent yielding aldehyde (compare British Patent 342,767). The advantage of this two-stage process is such that the resin flows better under pressure, and that in the first stage it is fusible and soluble in some solvents. A further modification of this two-stage process forms the subject-matter of British Patents 372,075, 372,076 and 373,358.

It is further known that fusible, soluble amine resins may be made by condensing an aromatic amine and an aldehyde without an acid or in presence of only very small proportions of acid. Such a soluble, fusible resin is obtained, for example, as described in German Patent No. 335,984, by heating anhydroformaldehyde-aniline either by itself or with addition of a small proportion of acid or alkali, with or without the addition of aniline, for some time at 130–140° C. Similar fusible resins are obtained by the process described in U. S. Patent No. 1,777,140. By this process an aromatic amine and formaldehyde are caused to react with each other without the aid of a condensing agent. The oily or solid product thus obtained is then freed from by-products, which can be separated by distillation, by heating it in a vacuum, whereby a hard and brittle soluble resin, which softens at about 50° C., is obtained. According to a variant of the process of said U. S. patent resins of this kind are obtained in better yield and with a somewhat higher softening point by bringing into reaction with each other an aromatic amine, in presence of a small proportion (1–10 per cent.) of one of its salts, and formaldehyde, and thereupon heating the product separated from the solution with or without the use of a vacuum (cf. page 2, lines 71 and sqq. of said patent). Similar, soluble aldehyde-amine condensation products are described in British Patent No. 275,725. In that case equimolecular proportions of a primary aromatic amine and formaldehyde are condensed in the presence of a small proportion of acetic acid or hydrochloric acid. The resin is freed from the mother liquor by decantation. By heating it to 200° C. its softening point can be raised from 25° C. to 70° C.

All these fusible resins differ from those referred to in the introductory paragraph in that they are made without a condensing agent, or in presence of only a very small proportion thereof.

It has been previously known that in uniting formaldehyde with an aromatic amine, the attack of the aldehyde always occurs primarily at the nitrogen, in contrast with the behavior of phenol, in which the aldehyde always attacks the nucleus. The product first formed always appears to be anhydroformaldehyde-aniline ($C_6H_5N=CH_2$). Its characteristic azomethine group $-H=CH_2$ is supposed to be the resin-forming group (compare Scheiber & Sändig, Die künstlichen Harze, 1929, page 98). The anhydroformaldehyde-aniline passes, even on standing, into a sparingly soluble polymeric form and, when heated, produces, as is shown by the specifications referred to in paragraph 2, soluble, fusible resins, which are regarded by the above authors as azomethine resins and their resinous character is attributed to polymerization of the azomethine group and not to the formation of methylene nuclear compounds. All these fusible and non-moldable resins, referred to above, belong to this class, the common characteristic of which is that they are formed by heat-treatment of previously produced or intermediately produced anhydroformaldehyde-aniline, either alone or in presence of small proportions of acid.

In acid media, however, the azomethine group $-N=CH_2$ reacts with aromatic nuclei RH with formation of the group $-NH-CH_2-R$. When formaldehyde acts on an aqueous solution of anilinehydrochloride at a moderate temperature there occurs, without separation of anhydroformaldehyde-aniline, an immediate transformation to polymeric anhydropara-aminobenzyl-alcohol, for which by analogy to the recent work on highly polymeric substances (compare Staudinger, Ber. 53, 1073, Jahrg. 1920, and 59, 3019, Jahrg. 1926) must be assigned the chain formula

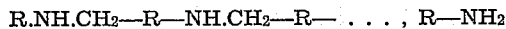

(R=aryl residue). Apparently, the same product is produced by treatment of anhydroform-aldehyde-aniline with aqueous hydrochloric acid at raised temperature (compare British Patent 342,767), the methylene group being on one side split off from the nitrogen and attached to the next nucleus.

These fusible resins are not soluble in alcohol, benzene or the like, but they are soluble in many solvents of high boiling point. By the action of further quantities of aldehyde there apparently occurs bridge formation between the aryl nuclei of this chain whereby stable bodies are formed which are no longer fusible, and, as is known, are capable of yielding molded articles of high quality.

While, therefore, the fusible resins of this series already exhibit chain structure and by union with further quantities of aldehyde become capable of being hardened (compare the British Patents 342,321, 342,767, 372,075, 372,076 and 373,358), the azomethine resins could not hitherto be hardened and thus their solubility in solvents of low boiling point could not be made use of for the production of molded products.

It appears that the amine-resins of satisfactory strength and a good resistance to heat must contain more than one molecule of aldehyde to one molecule of primary aromatic amine and that at least a considerable portion of the methylene linkings must be attached to the nucleus. In order to produce such resins it is necessary therefore to introduce further aldehyde into fusible resins, designated above as azomethine resins, so as to produce the greatest possible formation of methylene bridges. The methods usual in the artificial resin industry of heating to a high temperature, as for instance 160-200° C., do not in this case attain the desired end, even in presence of acids. Decompositions and degradations are to be observed.

According to the present invention there is a surprising hardening of these azomethine resins to form substances capable of being molded, when the fusible resins are subjected, in the presence of aldehydes or agents yielding aldehyde and in the presence of acids, to the action of a moderate temperature, preferably not above 140° C. The duration of heating depends largely on the resins used and the additions selected. The products thus obtained lend themselves to treatment at higher temperatures, if desired under pressure, to conversion into infusible artificial resins. As aldehydes there may be used formaldehyde, para-formaldehyde, furfural, crotonic aldehyde, paraldehyde, acrolein or the like. As substances yielding aldehyde there may be used hexamethylene-tetramine, polyphenol-alcohols or the like. In the case of resins which from their manufacture still contain acid, it is in general, not necessary to add a further quantity of acid at the following step of treating with aldehydic substances.

It is particularly advantageous that this hardening can be produced after the saturation of the filling material with the solution of the azomethine resin, whereby particularly homogeneous, molded pieces are obtained. It is possible, indeed, to produce the condensation product in presence of the filling material and then to cause the conversion in the presence of a further quantity of aldehyde or agent yielding aldehyde. The hardened resins thus made are not identical with the amine-resins made in the presence of considerable proportions of acid, since the conversion does not occur without residue.

The present process is especially applicable to fusible condensation products of aniline and formaldehyde, but also fusible condensation products of other primary aromatic amines, such as for instance m-toluidine, α-naphthylamine, with formaldehyde may be transformed in the same way into artificial materials.

As acids applicable in this process there may be mentioned for instance inorganic acids, such as hydrochloric acid or nitric acid, and organic acids, such as acetic acid, salicylic acid and so on.

The new products are useful for the various purposes of the artificial resin industry.

The following examples illustrate the invention, the parts being by weight:—

*Example 1*

100 parts of aniline (1.08 mol.) and 88 parts of formaldehyde of 37 per cent. strength by volume (1 mol.) are heated with 10 parts of nitric acid of 20 per cent. strength for some hours on the water-bath. After cooling, the liquid phase is decanted and the resin fused at 110-120° C. 100 parts of the light yellow resin, which is hard and brittle at room temperature, are ground with 40 parts of furfural and the mixture is heated for 10 hours at 75-80° C., whereby a dark red, very homogeneous molding powder is obtained. This is capable of yielding deep black, lustrous molded articles when finally hardened at about 155° C. under pressure.

*Example 2*

Into 93 parts of aniline (1 mol.) are introduced 7 parts of salicylic acid (0.05 mol. of salicylic acid per 1 mol. of amine). While stirring well, there are added 81.5 parts of formaldehyde of 40 per cent. strength by volume (1 mol.) in such a manner that the mixture becomes heated to 80-90° C. by the exothermic reaction. The mass is now heated on the water-bath in a reflux apparatus for 4 hours and, after cooling, 100 parts of the resin are well ground with 100 parts of wood-meal which has been saturated with 30 parts of furfural. After standing for some time at room temperature, the mass is molded at 145° C. to produce a homogeneous compressed article.

*Example 3*

93 parts of aniline (1 mol.) are, together with 1 part of salicylic acid, gradually mixed, by good stirring, with 81.5 parts of formaldehyde of 40 per cent. strength (1 mol.). The mixture is heated for 1 hour in a reflux apparatus. After cooling, the light yellow, soluble, fusible resin is freed by decantation from the liquid phase and then heated for 3 hours at 120° C. and left to cool. 150 parts of this resin are thoroughly mixed with 150 parts of wood-meal and 40 parts of furfural, to which 1.5 part of salicylic acid has been added, and the mixture is heated for 8 hours to 60-70° C. The powder thus obtained is ground and is capable of being molded at 145° C. to produce black, very homogeneous compressed articles of good mechanical strength.

*Example 4*

186 parts of aniline (2 mol.) are dissolved in 300 parts of alcohol of 94 per cent. strength and the solution is mixed gradually, while stirring, with 450 parts of formaldehyde of 37.1 per cent. strength by volume (5.1 mol.), and the whole is heated for one hour in a reflux apparatus. The mixture thus obtained is now carefully heated under 35-40 mm. pressure to 180° C., and in this manner the volatile portions are removed. After cooling, the residue solidifies to a soluble, hard and brittle resin. 20 parts of this resin are dissolved in 80 parts of benzene, the solution is kneaded with 60 parts of wood-meal and the solvent is then expelled. The residue is mixed with 2 parts of para-formaldehyde and the mixture is heated for 10 hours in a closed vessel at 60-80° C. The molding powder thus treated is capable of being molded at 130° C. to produce dark, very homogeneous compressed articles.

*Example 5*

Into 372 parts of aniline (4 mol.) are introduced 200 parts of alcohol of 94 per cent. strength and 18.5 parts of formic acid of 85 per cent. strength, and this mixture is gradually mixed with 347 parts of formaldehyde of 37.5 per cent. strength by volume (4 mols.). The whole, after being heated in a reflux apparatus, is further treated in a vacuum as described in Example 4. 100 parts of the fusible resin thus obtained are well mixed, after cooling, with 15 parts of para-formaldehyde and the mixture is heated for some hours at 140° C. In this manner it is converted into a brown molding powder, which is capable of being molded at about 145° C. to yield a compressed product of good strength.

*Example 6*

186 parts of aniline (2 mol.) and 20 parts of glacial acetic acid are gradually mixed by well stirring with 173 parts of formaldehyde of 37.5 per cent. strength by volume (2 mol.). The mixture is heated for about 10 minutes at 90-95° C., then allowed to cool, whereupon the liquid phase is decanted from the solidified hard and brittle resin. 100 parts of the fusible resin thus obtained are ground with 10 parts of para-formaldehyde and the mixture is heated for a long time (36 hours) to 50-60° C. The light yellow, infusible molding powder thus obtained may then be compressed at 145° C., whereby it yields products which are characterized by a particularly good tendency to flow and by their clearness.

*Example 7*

280 parts of dry wood-meal are saturated with 186 parts of aniline (2 mol.) in a Werner Pfleiderer apparatus and then united with 163 parts of formaldehyde of 40 per cent. strength (2 mol.) containing 5 parts of glacial acetic acid. The mixture becomes hot and loses its odor of aniline and formaldehyde. The mixture is dried and mixed in a Werner Pfleiderer apparatus with 80 parts of furfural, and is then preliminarily hardened in a closed vessel for 2 days at 70° C. Thereafter the temperature is raised for a short time to 110° C., after which the mass is dried in a vacuum at 70° C. The almost black mass, which has been hardened in this manner, is now ground with 1 per cent. of stearic acid and ½ per cent. of zinc stearate, and is compressed at 145° C. to form very homogeneous, lustrous, black molded articles.

What we claim is:—

1. Process for the manufacture of infusible but thermoplastic synthetic resinnous products from fusible condensation products obtained by the reaction of a primary aromatic amine and formaldehyde in the presence of less than ¼ molecular proportion of acid for each molecular proportion of amine, which comprises reacting the fusible condensation product with a further quantity of an aldehydic substance in presence of an added acid condensing agent at a temperature not exceeding 140° C., and thereafter hardening the reaction product at a raised temperature.

2. Process for the manufacture of infusible but thermoplastic synthetic resinous products from fusible condensation products obtained by the reaction of aniline and formaldehyde in the presence of less than ¼ molecular proportion of acid for each molecular proportion of amine, which comprises reacting the fusible condensation product with a further quantity of an aldehydic substance in presence of an added acid condensing agent at a temperature not exceeding 140° C., and thereafter hardening the reaction product at a raised temperature.

3. Process for the manufacture of infusible but thermoplastic synthetic resinous products from fusible condensation products obtained by the reaction of a primary aromatic amine and formaldehyde in the presence of less than ¼ molecular proportion of acid for each molecular proportion of amine, which comprises reacting the fusible condensation product with a further quantity of an aldehydic substance in presence of an acid condensing agent at a temperature not exceeding 140° C., and thereafter hardening the reaction product at a raised temperature under pressure.

4. Process for the manufacture of infusible but thermoplastic synthetic resinous products from fusible condensation products obtained by the reaction of aniline and formaldehyde in the presence of less than ¼ molecular proportion of acid for each molecular proportion of amine, which comprises reacting the fusible condensation product with a further quantity of an aldehydic substance in presence of an acid condensing agent at a temperature not exceeding 140° C., and thereafter hardening the reaction product at a raised temperature under pressure.

THEODOR SUTTER.
WERNER WIELAND.